United States Patent Office 3,579,464
Patented May 18, 1971

3,579,464
NONDECREPITATING SILICA GEL AND
METHOD FOR ITS PREPARATION
Harvey Rosen, Laurel, and Ellsworth G. Acker and Hanju Lee, Baltimore, Md., assignors to W. R. Grace & Co., New York, N.Y.
No Drawing. Filed May 20, 1968, Ser. No. 730,620
Int. Cl. B01j 13/00; C01b 33/16; C09k 3/00
U.S. Cl. 252—317                                 10 Claims

ABSTRACT OF THE DISCLOSURE

Conventional partially dried silica hydrogel particles having about 2–20% moisture content are ground to about 1–500 microns. This powder is then blended with silica hydrosol solution in proportions such that the weight ratio of silica from the hydrogel particles to silica in the hydrosol is about 15:11. The resultant mixture is then extruded, beaded, pelleted or otherwise shaped. The thus shaped products are then aged, washed, dried and activated.

---

This invention relates to silica gel. More specifically, this invention relates to silica gel that does not decrepitate when exposed to water.

Silica gel has long been known for its ability to adsorb large amounts of water, and hence, it has found much usage in the gas drying and non-aqueous liquid drying arts. However, one undesirable characteristic of silica gel is that when it is directly contacted by liquid water (as opposed to water vapor), the gel particles decrepitate or split into finer size particles. This phenomenone is believed to result from several factors among which are:

(1) Heat of adsorption;
(2) Rapidly expanding gases within the gel lattice;
(3) Pre-existing stresses within the gel lattice.

Silica gel is prepared by neutralizing sodium silicate solution with excess acid to form silicic acid hydrosol, allowing this hydrosol to set to a hydrogel, washing the salts from the hydrogel, and drying the washed hydrogel to form the dried silica gel. This solid is then pulverized to the desired particle size and dried.

However, at this point the silica gel is not suitable for water adsorption. It must first be activated, a step which requires heating to a temperature of about 200 to 300° C. It is this step which dehydrates the gel and converts it from its silicic acid form to silica, and in so removing free water and water from condensation reaction, leaves relatively large void spaces in the gel lattice. When contacted with water vapor, the thus activated silica gel can adsorb moisture by adsorbing the water molecules on the surface of the silica (silanol sites) and in the aforementioned voids or pores. Hence, the air occupying the spaces in the gel lattice has been replaced by water molecules. Furthermore, a measurable amount of heat is given off during the water adsorption process.

It is believed that when anhydrous silica gel is contacted by liquid water, the adsorption rate is such that an excess amount of heat of adsorption is produced and that the rate of displacement of gases by water within the gel structure is increased to such an extent that a relatively high internal pressure develops. This pressure is attributable to the increased temperature causing the entrapped gases to expand.

The remaining consideration is that of internal stresses in the gel structure. It is believed that these stresses result from several physico-chemical sources, foremost of which is distortion of Si—O—Si bonds. When the silica hydrosol is permitted to set or gel, what takes place is the formation of inter-molecular bonds, i.e. the silicic acid molecules being to polymerize. This polymerization is neither spontaneous, nor orderly. It occurs gradually and the polymerization is one which occurs by chain propagation, and followed by pressure on the stressed system. Initially this may be a hydrogen bond between two silicic acid molecules in the hydrosol and hydrogel states. The bonding is converted to the Si—O—Si type during the drying process. During drying some silanol bonds are condensed to form Si—O—Si bonds of normal geometry which are later distorted by shrinkage and further bonding. Hence as the polymerization of the silicic acid continues, many of the intramolecular bonds become distorted, the result being that the structural lattice of silica gel is highly stressed.

It is therefore believed that the combination of rapid temperature change, internal pressure, and internal stresses contribute to the decrepitation or scission which is observed when normally prepared silica gel is contacted with liquid water.

Heretofore, prior art methods or making silica gel have failed to produce a gel which is non-decrepitating when exposed to water. One such method is taught by U.S. Pat. 2,900,349, Schwartz. This method comprises incorporating into a silica hydrosol a finely divided (between 1–5 microns) solid material in an amount of about 5–40 volume percent, and allowing the hydrosol to set or gel. Some of the powdered materials contemplated are graphite, sand, aluminum phosphate, metallic aluminum, etc. Gels made by this method are found to have good stability against mechanical attrition, but readily decrepitate when immersed in water.

It is believed therefore, that to prevent decrepitation of silica gel in water, it is necessary to in some manner overcome the effects of heat of adsorption, internal pressure in the gel lattice, and internal stresses in the gel lattice. The instant invention has overcome these effects to the extent that silica gel products resulting therefrom do not decrepitate when immersed in water.

It is therefore an object of this invention to provide an improved silica gel.

It is a further object of this invention to provide a silica gel that does not decrepitate when contacted with water.

It is a further object of this invention to provide a method for preparing an improved silica gel.

Still another object of this invention is to provide a method for preparing silica gel that does not decrepitate when contacted with liquid water.

Still another object of this invention is to provide a method for preparing shaped articles from silica gel which do not decrepitate when contacted with liquid water.

Still another object of this invention is to provide a method for preparing shaped articles from silica gel which do not decrepitate when contacted with liquid water.

Other objects and advantages of this invention will appear obvious to those skilled in the art from the following detailed description.

In summary, this invention comprises preparing shaped silica gel objects which can be used in systems utilizing adsorbent materials and which do not decrepitate when contacted by liquid water. These adsorbent objects are prepared by blending finely divided, partially dried (2–20% moisture by weight) silica gel with enough silica hydrosol to form a moldable, extrudable paste, said paste being of such a consistency that when formed into a shaped article, it has the ability to retain said shape. The thus shaped objects are then allowed to age for such a time as is necessary to permit hardening, after which said hardened shaped objects are washed to remove salts entrapped therein. The salt-free shaped objects are further prepared by drying, followed by activation.

The finely ground silica gel used in this invention is preferably gel obtained from an acid-set hydrosol, i.e. sols which have been gelled at a pH of about 1.5, but gels obtained under more basic conditions (pH up to about 10.8) can also be effectively used. As used herein, the particle size of said finely divided silica gel is less than about 500 microns (about −32 mesh Tyler Standard Screen Scale Sieve) and is preferably between about 1–300 microns. Said silica gel powder need not be completely dried, nor activated. Preferably, the gel used has a moisture content of about 2–20% by weight.

Silica hydrosols which are preferred in this invention are prepared by any method known to those skilled in the art of making acid-setting silica hydrosols. Such a method typically comprises neutralizing an aqueous solution of sodium silicate of about 15% silica with sulfuric acid until a pH of about 1.5 is attained.

The mixing of blending of the finely divided silica gel and silica hydrosol can be accomplished by any method which permits complete dispersal and distribution between the solid and liquid phases, thus forming a homogeneous dispersion having a paste consistency. Typically, a mixing device such as an ordinary kitchen mixer may be used in blending said paste.

In blending the finely divided silica gel with the silica hydrosol, any weight ratio of silica gel to silica contained in the silica hydrosol may be employed, provided said ratio yields a paste which when formed into a shaped object will maintain its dimensional integrity. Thus, said paste must be such that objects shaped therefrom will not lose their shape upon standing. Preferred weight ratios of silica gel to silica contained in the silica hydrosol are about 5–20 to one.

There are myriad methods which may be used to form shaped objects from the gel-hydrosol paste and the particular method employed is dictated by the desired shape of the object. For example, if cylindrical particles of uniform size are desired, the paste can be extruded through a circular orifice and cut to the desired lengths. One such extruder is a Welding Engineer's Model D-2EC5. If spherical particles are desired, the paste can be stirred in a circular mixer until spherical particles are formed. One such circular mixer is commonly referred to by those skilled in the art as a Pony mixer. Said mixer comprises a cylindrical rotating container having inserted thereinto two counter-rotating enmeshing blades. Said mixing device closely resembles that type of mixing device ordinarily used in the household kitchen. Said blades are driven by a high torque motor and the silica gel-hydrogel mixture is blended at a relatively low speed. The silica-silica hydrosol paste can also be molded to form irregular shapes if desired.

By "aging the shaped formed objects" is meant placing the objects in a closed container (to preclude moisture evaporation) and allowing said objects to stand undisturbed until hardened. Although the shaped objects when first formed can retain their respective shapes, they are still semi-rigid and are therefore susceptible to distortion from mechanical influence. Hence, the objects are aged until they have hardened to such an extent as to be relatively immune to mechanical influences, as for example, moderate handling. The objects encompassed by this invention are aged for more than about 1 hour, and are preferably aged for about 2–120 hours.

The thus aged silica gel objects are washed in order to remove salts which were dissolved in the silica hydrogel and which are now trapped within the hardened shaped objects. Said washing may be accomplished by repeated application of a solution of pH of about 0.5–10 to the shaped objects. Preferably, said objects are washed with an aqueous mineral acid solution having a temperature of about 20 to 60° C. and a pH of about 2 to 5.

The desalted shaped objects may be dried under conditions identical to those used for the drying of normal acid-set silica gel, said conditions being well known to those skilled in the art. Preferably, said objects are dried at a temperature of about 90 to 200° C.

The thus dried shaped objects are activated in the same way that normal desiccant silica gel is activated, said activating conditions being well known to those skilled in the art. In a preferred embodiment of this invention, the silica gel objects are activated at a temperature of about 200 to 300° C.

The following examples are provided to further point out the various aspects of the invention, but they are in no way intended as limiting said invention.

EXAMPLE I 1400 g. of finely divided acid-set silica gel having a particle size distribution of 1–300 microns and an average particle size of 80 microns, and having a moisture content of 5% was thoroughly mixed in a Pony mixer with 170 ml. water, and 985 g. of an acidic silica hydrosol having a pH of about 1.5 and a silica content of about 15% by weight. This mixture had a paste like consistency. The paste was then extruded through a Welding Engineer's Model D-2EC5 extruder into cylindrical pellets measuring about 3/16 inch in diameter by about 1/4 inch in length. These extrusions were then placed in a covered container and aged for about 36 hours. After aging, the pellets were washed for about 1.5 hours at about 60° C. with a sulfuric acid solution of pH 3.0, dried at 200° C. for 3 hours, and activated at 300° C. for 1/2 hour.

EXAMPLE II

The adsorbent silica gel pellets prepared in Example I were tested for their ability to resist decrepitation when contacted with water by immersing in water and reactivating at 200° C. for 3 hours. This procedure was repeated four times and the pellets did not decrepitate. After said tests were performed, the gel pellets were found to have a moisture adsorption capacity of 7.0% by weight at 10% relative humidity and 12.5% at 20% relative humidity as measured over known concentration sulfuric acid solutions.

EXAMPLE III 2000 g. of finely divided acid-set silica gel having a particle size distribution of 1–250 microns and an average particle size of 25 microns, and having a moisture content of about 7.2% by weight was thoroughly mixed in a Pony mixer with 90 ml. of water and 1374 g. of an acidic silica hydrosol having a pH of about 1.5 and a silica content of about 15% by weight. This mixture was stirred for about 45 minutes after which time said mixture had formed into spherical balls of about 4 to 8 mesh in size. The thus formed balls were aged in a closed container for about 24 hours. After aging, the balls were washed for about 2 hours at about 60° C. with a sulfuric acid solution of pH 3.0, dried at about 200° for 3 hours, and activated at 300° C. for 1/2 hour.

EXAMPLE IV

The adsorbent silica gel balls prepared in Example III were tested for their ability to resist decrepitation when contacted with water by the same method as employed in Example II. Said desiccant gel balls maintained their physical integrity after four cycles of wetting with liquid water and subsequent reactivation at 200° C. for three hours. After said tests were performed, the gel pellets were found to have a moisture adsorption capacity of about 7 at 10% relative humidity and about 12.5 at about 20% relative humidity as measured over known concentrations of sulfuric acid solutions.

We claim:
1. A method for preparing silica gel objects, said objects being characterized by being non-decrepitating when exposed to liquid water, said method comprising:
 (a) preparing a paste by blending silica gel having a particle size of less than about 500 microns with a silica hydrosol;
 (b) forming shaped objects from said prepared paste;
 (c) aging said formed shaped objects to obtain hard- ened, shaped objects for more than about 1 hour while precluding moisture exaporation;

(d) washing said hardened, shaped objects to remove salts entraped therein;

(e) drying said desalted shaped objects; and (f) activating said dried, shaped objects to obtain adsorbent silica gel objects which are non-decepitating when exposed to liquid water.

2. The method of claim 1 wherein said silica gel in said paste has a particle size of about 1–300 microns.

3. The method of claim 2 wherein the weight ratio of silica gel to silica contained in said silica hydrosol is about 5–20 to 1.

4. The method of claim 3 wherein said formed objects are prepared by extrusion.

5. The method of claim 3 wherein said formed objects are aged for from about 2 to 120 hours.

6. The method of claim 1 wherein:

(a) said silica gel and said paste has a particle size of about 1–300 microns, and the weight ratio of silica gel to silica contained in said silica hydrosol is about 5–20 to 1;

(b) said formed shaped objects are prepared by extrusion into cylindrical measuring about 1/16 to 3/8 inches in diameter by about 1/8 to 1/2 inches in length;

(c) said formed shaped objects are aged for longer than about 1 hour while precluding moisture evaporation;

(d) said hardened shaped objects are washed at about 20 to 60° C. for about 1/2 to 2 hours with an equeous solution of about 0.5 to 10 pH;

(e) said desalted shaped objects are dried at about 90 to 200° C.; and (f) said dried shaped objects are activated at about 200 to 500° C.

7. The non-decrepitating silica gel objects prepared by the method of claim 1.

8. The non-decrepitating silica gel objects prepared by the method of claim 3.

9. The non-decrepitating silica gel objects prepared by the method of claim 4.

10. The non-decrepitating silica gel objects prepared by the method of claim 6, said objects being further characterized as having a bulk density of about 25 to 50 lb./ft.$^3$, and a water vapor capacity of about 12.0 to 14.5 percent by weight at a relative humidity of 20%.

References Cited
UNITED STATES PATENTS

| | | | |
|---|---|---|---|
| 1,798,766 | 3/1931 | Stoewener | 252—317X |
| 2,408,656 | 10/1969 | Kirk | 252—317X |
| 2,462,798 | 2/1949 | Wilson, Jr. | 252—451X |
| 2,564,776 | 8/1951 | Bodkin et al. | 252—317 |

RICHARD D. LOVERING, Primary Examiner

U.S. Cl. X.R.

23—182; 252—194, 451; 264—177